United States Patent [19]
Bruder et al.

[11] Patent Number: 5,527,139
[45] Date of Patent: Jun. 18, 1996

[54] VEHICLE DOOR PROTECTION SYSTEM

[75] Inventors: Karl R. Bruder, Holly; James P. Olender, Fenton; Bill A. Skaggs, Flint, all of Mich.

[73] Assignee: Creative Foam Corporation, Fenton, Mich.

[21] Appl. No.: 120,689

[22] Filed: Sep. 13, 1993

[51] Int. Cl.⁶ .............................. B60P 7/16; B61D 45/00
[52] U.S. Cl. ........................ 410/117; 105/374; 267/140
[58] Field of Search .................. 410/4, 87, 88, 410/117, 118; 293/128; 267/139, 140; 105/374; 49/462

[56] References Cited

U.S. PATENT DOCUMENTS

| | | | |
|---|---|---|---|
| 3,263,830 | 8/1966 | Anderson | 410/117 X |
| 3,881,767 | 5/1975 | Klees | 410/87 X |
| 3,975,006 | 8/1976 | Peterson | 267/139 |
| 4,313,987 | 2/1982 | McCormick | 428/40 |
| 5,227,217 | 7/1993 | Roberts et al. | 49/462 |
| 5,239,933 | 8/1993 | Murphy et al. | 105/374 |
| 5,320,392 | 6/1994 | Hart | 293/128 |

FOREIGN PATENT DOCUMENTS 2835219  2/1980  Germany ................ 410/118

Primary Examiner—Michael S. Huppert
Assistant Examiner—Stephen Gordon
Attorney, Agent, or Firm—Brooks & Kushman

[57] ABSTRACT

The vehicle door protection system is comprised of a frame having a support portion and an attachment portion, a shock absorbent member and normally removable fasteners for attaching the frame to a vehicle wall section.

9 Claims, 6 Drawing Sheets

VEHICLE DOOR PROTECTION SYSTEM

TECHNICAL FIELD

This invention relates to protective devices or assemblies for preventing damage to a vehicle door when the vehicle is being transported in a vehicle carrier.

BACKGROUND ART

Automobiles and other vehicles are commonly transported between their initial manufacturing location and a final distribution location. These vehicles are often transported by the use of railroad cars or haulways. Transport railroad car systems and haulways or tractor trailer systems often incorporate multilevel auto rack systems including double-deck and triple-deck rail cars having various storage capacities.

It is known that these multilevel auto rack systems are constructed to leave as little excess space surrounding the vehicles to be transported as possible. In utilizing these vehicle carriers, it is necessary for a service person to drive the vehicles directly into the rail cars. The service person must then exit the vehicle and leave the vehicle carrier enclosure. It is necessary for the driver to exit the vehicle through the driver side door.

At this point, accidental door edge chips, dents and scratches are often created on the edges of the vehicle doors upon the driver's exit. These accidental damages are amplified by the fact that the vehicle carriers, as stated previously, are constructed to leave a minimal amount of unused space surrounding the vehicle.

It is thus desirable to employ some form of shock absorbent protector within the inside of the vehicle carrier enclosure to protect the vehicle doors from damage upon driver exit. Planar sections of shock absorbent foam are used in the industry. These shock absorbent foam sections are often glued directly to various impact surfaces of the vehicle carrier enclosure.

Problems exist in application of these foam sections to the vehicle carrier enclosure. Vehicle carriers are manufactured by numerous different rail car companies. As such, each vehicle enclosure is often different in structure, even though designed for transportation of identical vehicles. Most vehicle carriers include perforated side screens or side walls, vertical columns for supporting first, second and third decks, and structural cross supports further adding to the overall structural integrity of the vehicle rail cars. All the above structures provide impact surfaces for vehicle doors to strike upon driver exit.

Vehicle manufacturers or vehicle rail car owners commonly attempt to insure protection of the vehicles during transportation, by applying foam sections to various locations. One uniform pre-cut section of foam will not operate to protect all the various locations.

Attachment of planar foam sections to perforated side screen walls is very difficult due to the lack of adhesion of the foam to those portions of the perforated side wall having ventilation apertures. In addition, the perforated side screen walls are often constructed with continuous corrugation for added strength. Application of foam sections to these side wall sections is very difficult because of the angled corrugations.

In addition, application of foam sections to most impact surfaces is extremely difficult in cold temperatures as the adhesive required to affix a foam section to the impact surfaces operates poorly in cold temperatures. In addition, all impact surfaces must be free of dust and dirt which also hinders the fastening capabilities of the adhesives utilized.

Direct application of the foam sections to the side screens is also difficult utilizing common fasteners. As stated, the configuration of the side walls not only includes a plurality of equally spaced perforations for ventilation, but each row of parallel perforations is disposed upon alternating crests and valleys forming a corrugated wall section. Attempting to use common fasteners in cooperation with the perforations is difficult because of angled relationship of the perforations within the side wall.

Bi-level rail cars require protection from door edge chips due to contact with the corrugated side wall sections of the rail car, vertical support braces, and cross brace structural supports disposed at various locations along the rail car. Tri-level vehicle carriers not only require protection for the previous three areas, but also require protection along the roof rail section where side wall sections of the rail car meet the curved inner portion at the roof of the rail car.

Prior art solutions do not adequately meet the problems discussed above. U.S. Pat. No. 4,571,903 to Strassner, issued Feb. 25, 1986, discloses an automobile dent protection system for use in prevention of dents or scratches when a vehicle is parked in a regular parking space in a garage, carport or the like. An oversized pad is suspended from overhead in a location near the car, or between two adjacent cars for prevention of scratches induced by adjacent cars.

U.S. Pat. No. 4,437,697 to Hinojos, issued Mar. 20, 1984, discloses a retractable automobile side guard. The retractable automobile side guard device includes first and second telescoping assemblies which are extendable from first and second tubular housings attached to the bottom of an automobile. Each telescoping assembly includes a first member which, when fully extended from the tubular housing, pivots and is locked into an upright position and a second member which, when fully extended from the first member, pivots to a horizontal position and engages a like member from the other telescoping mechanism, thereby forming a side rail. The side rail prevents damage to the finish of the door panels and side panels of the automobile when other vehicle doors are open.

With particular reference to freight cars, U.S. Pat. No. 1,126,243 to McQouwn, issued Jan. 26, 1915, discloses a freight car attachment comprising a pad which is adapted to be secured to the end walls of a freight car. Flexible hinges are disposed on the pad to secure the pad to the freight car as a means for hanging the pad from the roof of the freight car.

SUMMARY OF THE INVENTION

In accordance with the present invention, the vehicle door protection system is comprised of a frame having a support portion and an attachment portion, a shock absorbent member and normally removable fasteners for attaching the frame to a vehicle wall section. The door edge protection system includes different embodiments each designed to protect the vehicle door edge from damage due to accidental impact against different wall section impact surfaces.

Accordingly, it is an object of the present invention to provide an improved removable door edge protection system including various dedicated door edge protectors for preventing damage to a door of a vehicle obtained through accidental contact with different impact surfaces located throughout the internal area of a vehicle carrier.

It is another object of the present invention to provide an improved removable door edge protection system which can be installed in many different types of vehicle carrier structures which are to be used under all weather conditions.

It is yet another object of the present invention to provide a door edge protector including a frame having a support portion and an attachment portion, the attachment portion having a fastening aperture and the support portion extending sufficiently from the attachment portion to form a mounting platform, and a normally removable fastener for securing the attachment portion to a vehicle transport wall section where the fastener is insertable through the fastening aperture of the attachment portion to cooperatively engage the vehicle transport wall section and locate the frame with respect to the wall section, and a shock absorbent member affixed to the mounting platform.

It is still another object of the present invention to provide the door edge protector of the last object above further including a first planar segment extending from the support portion, and a second planar segment foldably extending from the first planar segment where the first planar segment defines a first fastening aperture and a second planar segment defines a second fastening aperture wherein the second planar segment is foldable onto the first planar segment such that the first fastening aperture is disposed coaxially with the second fastening aperture for increasing the strength of the attachment portion.

It is yet another object of the present invention to provide a door edge protector substantially as described in the last object above further including a normally removable fastener which includes a head portion and a body portion extending along a longitudinal axis from one side of the head portion, where the body portion has a central shank extending along the longitudinal axis including a first segment and a second segment such that the first segment includes a first plurality of equidistant retaining fins extending laterally from one side of the shank and a second segment including a second plurality of equidistant retaining fins extending laterally from the other side of the shank wherein each of the first plurality of retaining fins is staggered along the longitudinal axis in relation to each of the second plurality of retaining fins so that such fins may, respectively, cooperatively, engage both sides of the vehicle transport wall section.

It is still yet another object of the present invention to provide a door edge protector substantially as described in the last object above wherein a support portion includes a fastening aperture and a normally removable fastener is insertable through both the attachment portion fastening aperture and the support portion fastening aperture for locating the attachment portion with respect to the support portion.

A still more specific object of the present invention is to provide a door edge protector having a support portion and an attachment portion, the attachment portion having a fastening aperture and further including a spring biased section having a first position before the fastener is inserted in a second position after the fastener is inserted, wherein the spring biased section in its second position locates the frame and the shock absorbent member with respect to the wall section.

Other objects, features and advantages of the invention will become apparent from a consideration of the following detailed description and from the accompanying drawings.

BEST MODE FOR CARRYING OUT THE INVENTION

Figure 1:
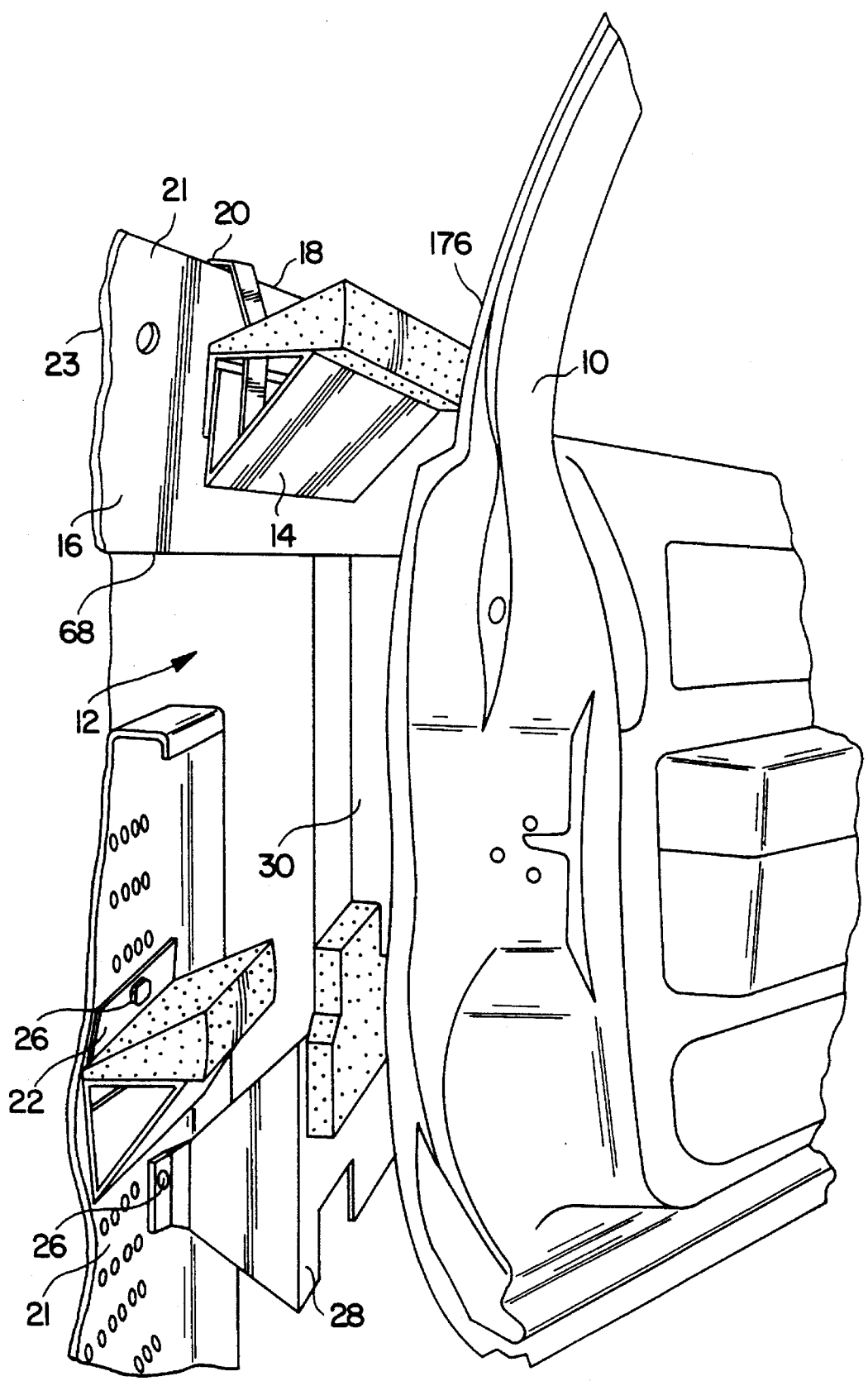
FIG. 1 is a fragmentary perspective view of a vehicle protection system of the present invention illustrating a roof rail protector, a side wall protector and column protector.

Referring now to FIG. 1, the door edge protection system of the present invention comprises a roof rail protector 14, side wall protector 22, and support protector 28. The protection system provides complete coverage of any impact surface located on a wall section 21 of a vehicle carrier which may be contacted by the operator by Swinging the vehicle door open upon exit. The individual door edge protectors of the present invention are disposed in FIG. 1, upon various impact locations on wall section 21.

A vehicle door 10 is positioned inside vehicle carrier 12. A roof rail protector 14 is shown affixed on roof rail 16 with normally removable clip fastener 18 extending over the top portion 20 of roof rail 16. Side wall protector 22 of the present invention is shown attached to corrugated side wall section 24 of vehicle carrier 12. Side wall protector 22 is affixed to corrugated side wall section 24 by one form of fastener 26 suitable for normally removable push insertion.

Support protector 28 is shown bridging support column 30. Support protector 28 is connected to vehicle carrier 12 by attachment to corrugated side wall segment 24 on one side and connected to an adjacent side wall segment 25 next to vertical support 30.

Figure 4:
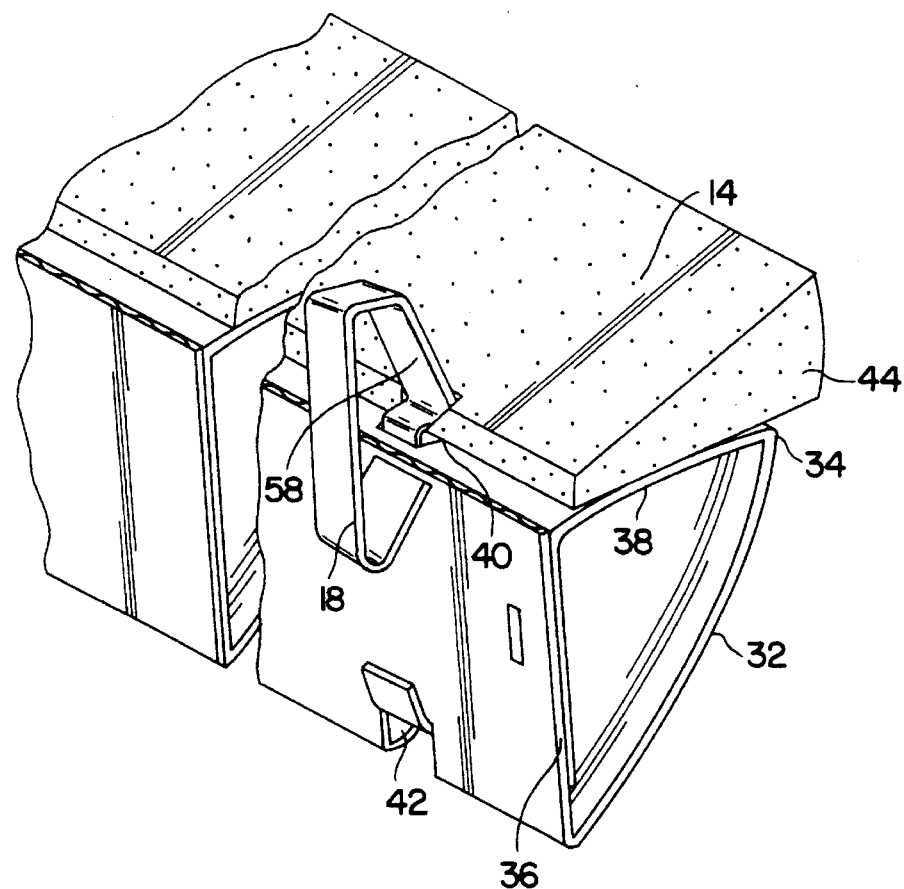
FIG. 4 is a fragmentary perspective view of a roof rail protector of the present invention.

Referring now to FIG. 4, the roof rail protector of the present invention is shown in more detail. Roof rail protector 14 includes a frame 32, including a support portion 34 and an attachment portion 36. Support portion 34 further includes a mounting platform 38, having a fastening aperture 40. Attachment portion 36 also includes a fastening aperture 42. Fastener 18 is normally removable and is adapted for insertion through apertures 40 and 42. A shock absorbent member 44 is disposed upon mounting platform 38. Shock absorbent member 44 extends out horizontally from mounting platform 38. Shock absorbent member 44 used with roof rail protector 14 is manufactured from a polymeric shock absorbing foam material with a two pound density.

Figure 6:
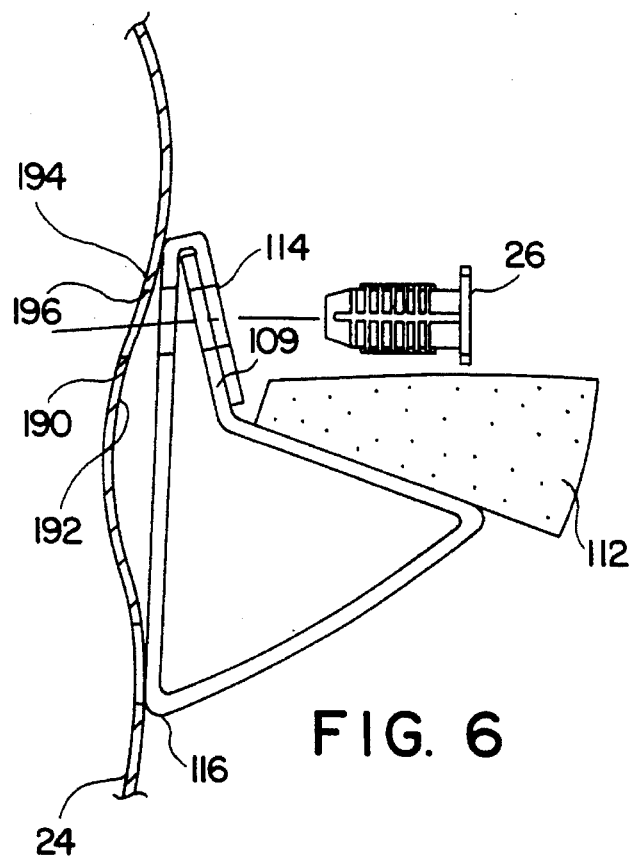
FIG. 6 is an exploded cross-sectional view, partially in elevation, of a side wall protector and fastener of the present invention.
Figure 7:
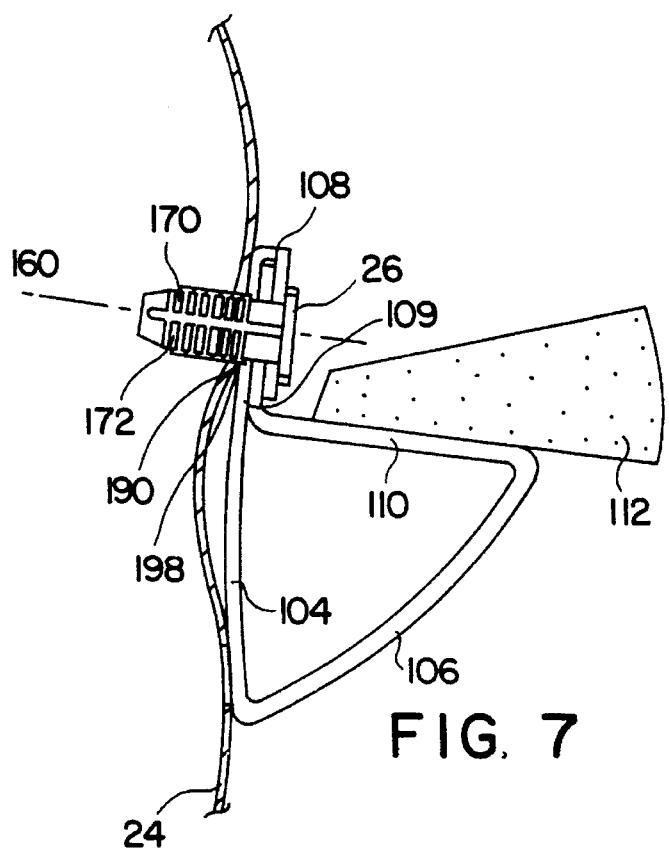
FIG. 7 is a cross-sectional view, partially in elevation, of the side wall protector and fastener of the present invention illustrating in phantom the position of the side wall protector as it is affixed to the side wall by the fastener.

Frame 32 is manufactured from a lightweight, corrugated plastic as shown in FIGS. 6 and 7. This lightweight, corrugated plastic is of a type which is easily foldable and which can be die cut to form fastening apertures. The corrugated plastic material provides a relatively strong frame which is substantially weather-resistant and is not excessively heavy.

Figure 11:
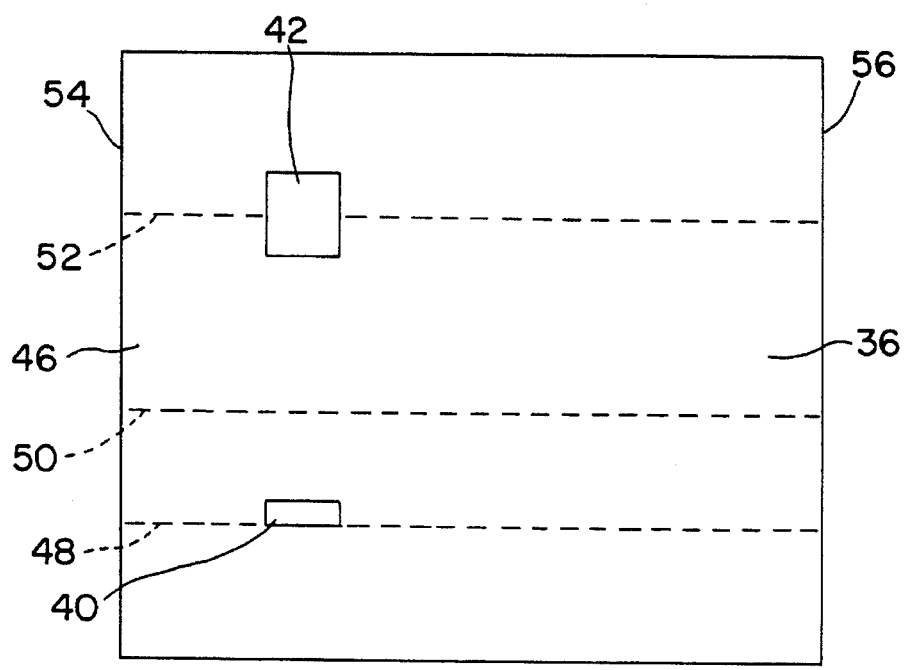
FIG. 11 is a front view of an unfolded roof rail protector of the present invention without a shock absorbent member affixed, illustrating various fold lines.

As can be seen from FIG. 11, frame 32 is formed from an integral sheet 46 of corrugated plastic. Integral sheet 46 includes first fold line 48, second fold line 50 and third fold line 52. First, second and third fold lines extend from end 54 of roof rail 16 to opposite end 56. Referring now to FIG. 4, mounting platform 38 is defined by folding integral sheet 46 at first fold line 48 and second fold line 50. Attachment portion 36 is created by folding integral sheet 46 at third fold line 52.

Fastening aperture 40 is located directly adjacent first fold line 48 between first fold line 48 and second fold line 50. Fastening aperture 42 may be located anywhere below third fold line 52, subject to the length of fastener clip 18. Fastening aperture 42 may also be partially located within bridge member 34 disposed between second fold line 50 and third fold line 52.

Figure 9:
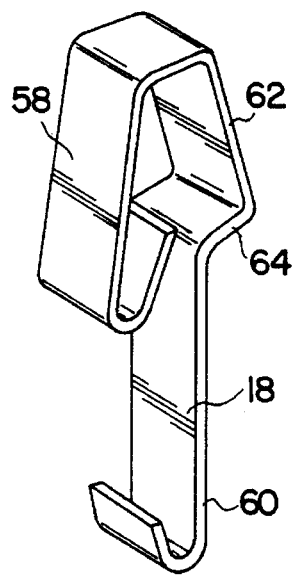
FIG. 9 is a perspective view of one form of a fastener suitable for use in the present invention.

FIG. 9 discloses normally removable clip fastener 18 of the present invention used in conjunction with roof rail 18. Clip fastener 18 is manufactured from a single blank of spring steel. Fastener 18 includes a first hook portion 58, a second hook portion 60, and a transition portion 62. Transition portion 62 includes a planar support shoulder 64, which as shown in FIG. 4, directly contacts shock absorbent member 44. Second hook portion 60 extends through both fastening aperture 40 and fastening aperture 42.

Figure 2:
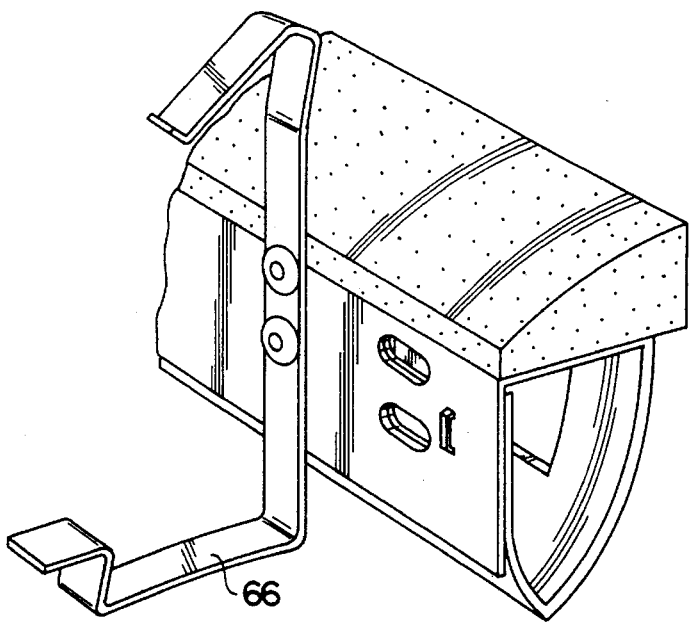
FIG. 2 is a perspective view of a prior art roof rail protector.

FIG. 2 illustrates a prior art roof rail protector manufactured by the assignee of the present invention. The prior art roof rail of FIG. 2 includes brace 66. As can be seen, brace 66 is attached to the prior art roof rail by a pair of independent permanent rivets.

It is known in the art that roof rail 16, as shown in FIG. 1, may be of many different dimensions depending upon the particular manufacturer of the vehicle transport carrier. All roof rails have a common top edge portion 20 adjoining two planar side surfaces 21 and 23, respectively. Variation in the design of the roof rail often occurs in the overall height of the roof rail from edge portion 20 to bottom edge 68 as shown in FIG. 1. As such, the roof rail protector of the prior art required matching a fastening brace 66 to a particular roof rail of the vehicle carrier. It was thus necessary to manufacture at least six or more different designs of fastening brace 66 incorporating different heights for use in various vehicle carriers.

In contrast, the roof rail protector of the present invention includes a one-piece clip fastener 18, which affixes roof rail protector 14 to roof rail 16 independent of the height of the roof rail. Clip fastener 18 is normally removable from roof rail 16.

More specifically, as shown in FIGS. 1 and 4, clip fastener 18 extends through frame 32, and connects to roof rail 16 through the use of first hook portion 58. First hook portion 58 extends over the top of roof rail 16 at edge portion 20. First hook portion 58 engages surface 23 of rail 16 while second hook portion 60 engages surface 21 of rail 16. Roof rail protector 14 of the present invention can thus be attached with use of fastener 18 to any of the various vehicle carrier wall sections incorporating roof rails of different widths. No matching of clip fasteners to particular roof rails is necessary and no additional parts are needed for assembly.

In addition, fastener 18 not only operates to attach roof rail protector 14 to roof rail 16, but also acts as an internal connector for keeping frame 32 folded in its particular operative condition. As shown in FIG. 4, staples or standard fasteners may also be used to keep roof rail protector 14 in a folded position. Additionally, use of fastener 18 instead of prior art brace 66 allows more efficient manufacture of roof rail protector 14 due to a reduction in parts needed for assembly. Roof rail protector 14 of the present invention does not require any additional fasteners for assembly, i.e. permanent rivets.

Figure 3:
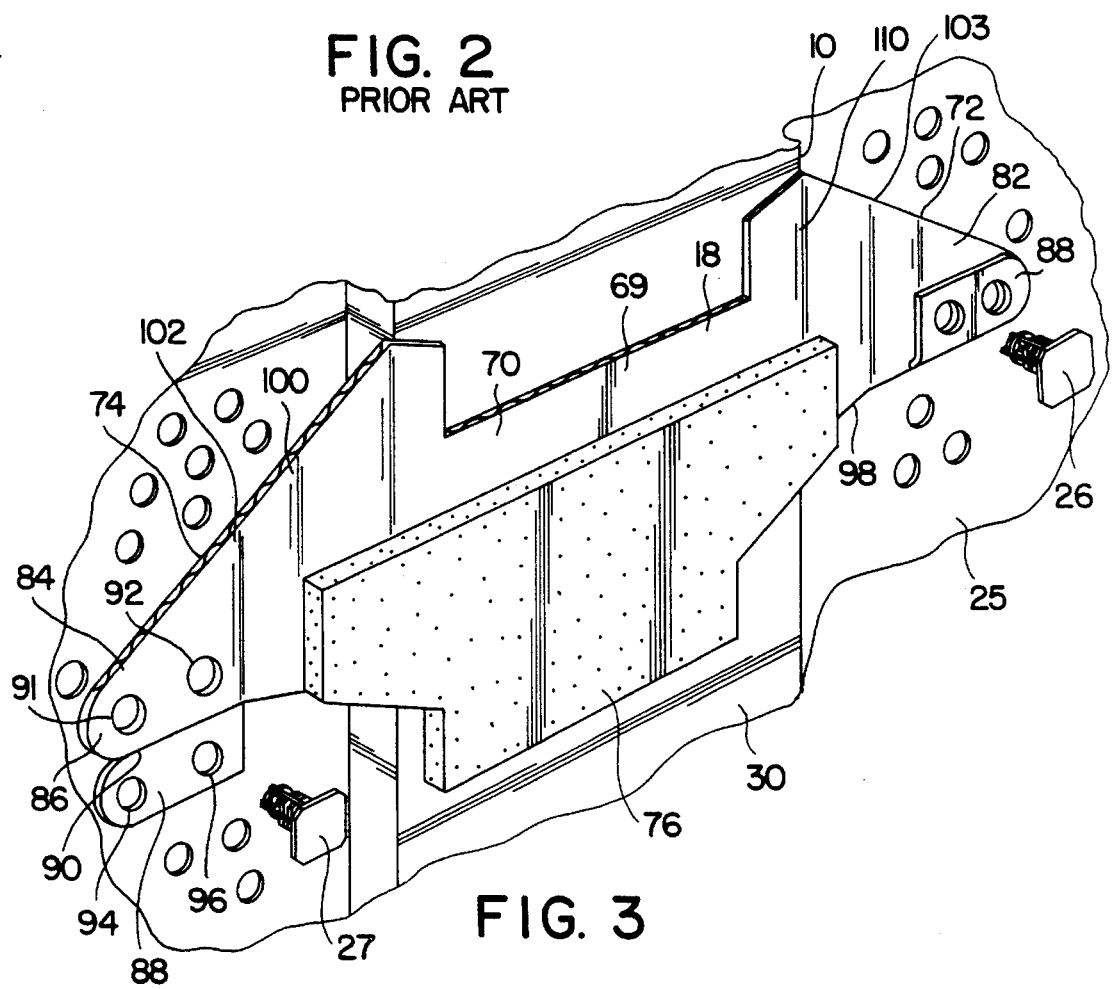
FIG. 3 is a perspective view of a column protector of the present invention.

Attention is now turned to a different embodiment of the present invention. Referring now to FIG. 3, support protector 28 is shown along with a pair of fasteners 26 and 27. Support protector 28 includes a frame 69 having a mounting platform 70, and a pair of attachment sections 72 and 74. Shock absorbent member 76 is shown disposed on mounting platform 70. Frame 69 has a first surface 78.

Attachment sections 72 and 74, respectively, include a planar segment 86 and a folded planar segment 88. Planar segment 88 includes fold line 90. As illustrated in FIG. 3, planar segment 86 has a pair of fastening apertures 91 and 92. Planar segment 88 includes a cooperating pair of fastening apertures 94 and 96, which are coaxial with fastening apertures 91 and 92 when planar segment 88 is folded upon planar segment 86.

Frame 69 of support protector 28 is comprised of the same corrugated plastic material as described above with regard to roof rail protector 14. Shock absorbent member 76 is comprised of a foam material similar to that of shock absorbent member 44 but utilizing a foam material having a four pound density.

Support protector 28 is likewise comprised of a integral sheet 98 of material, with the preferred embodiment being corrugated plastic. A pair of parallel fold lines 100 and 101 are located on integral sheet 98 on opposite sides of shock absorbent member 76. Mounting platform 70 is thus defined between parallel fold lines 100 and 101. A second pair of parallel fold lines 102 and 103 are located on frame member 69. Attachment portions 82 and 84 are located on the outer portions of frame member 69, respectively.

Figure 5:
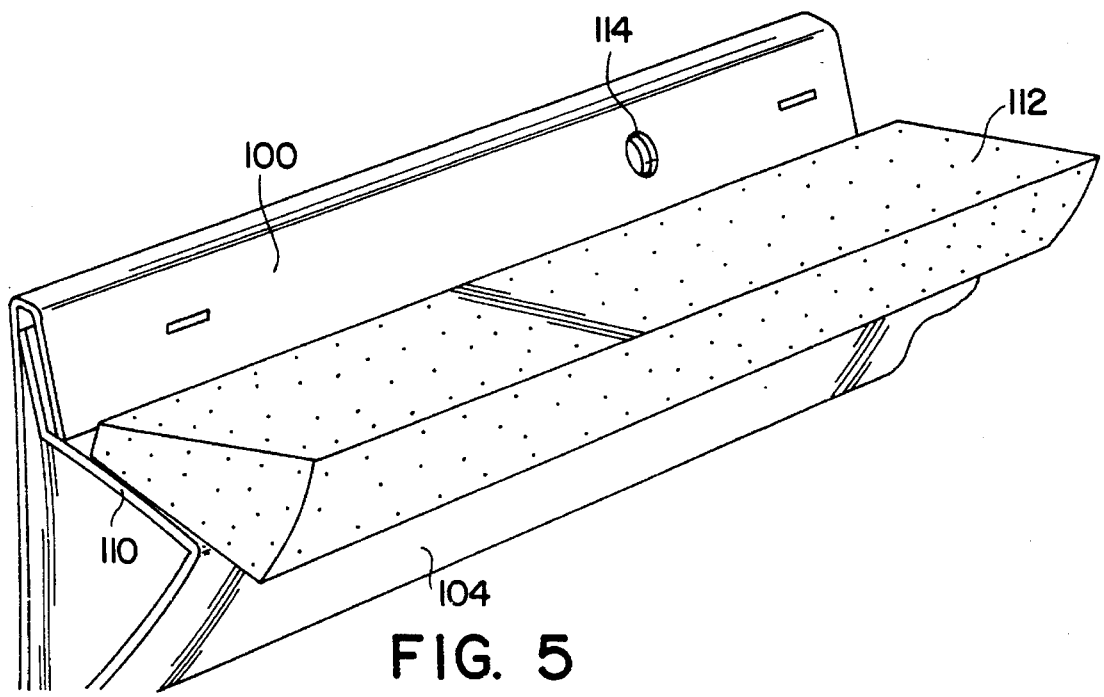
FIG. 5 is a perspective view of a side wall protector of the present invention.
Figure 12:
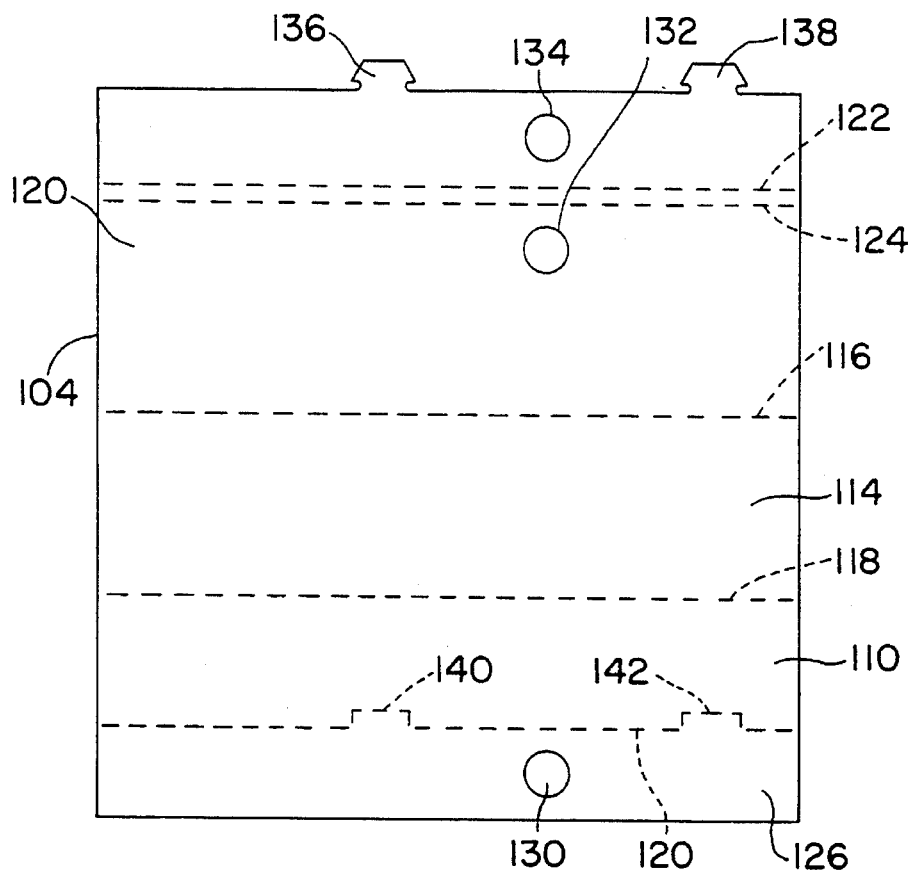
FIG. 12 is a front view of an unfolded side wall protector of the present invention without a shock absorbent member affixed, illustrating various fold lines.

Referring now to FIG. 5, side wall protector 22 includes a frame 104, having a support portion 106 and an attachment portion 108. Support portion 106 further includes a mounting platform 110. A shock absorbent member 112 is affixed to frame 104 upon mounting platform 110. As shown in FIG. 12 frame 104 comprises an integral sheet of plastic 114. Plastic sheet 114 includes parallel fold lines 116, 118, 120, 122 and 124. Support portion 106 is defined between fold lines 116 and 120. A planar segment 126 is defined on frame 104 on one side of fold line 120 opposite support member 106. A planar segment 128 is defined on frame 104 on one side of fold line 116 opposite support portion 106. A fastening aperture 130 is disposed on planar segment 126, and a second fastening aperture 132 is defined on planar segment 128.

A third aperture 134 is defined on frame 104 opposite fastening aperture 132. As can be seen in FIG. 5, the side protector of the present invention is folded and the planar segments simultaneously aligned such that fastening apertures 130, 132 and 134 are all coaxially aligned. Planar segment 128 further includes a pair of retaining notches 136 and 138, respectively, which cooperate with retaining slits 140 and 142 as shown in FIG. 12, to retain frame 104 in a folded position.

Figure 10:
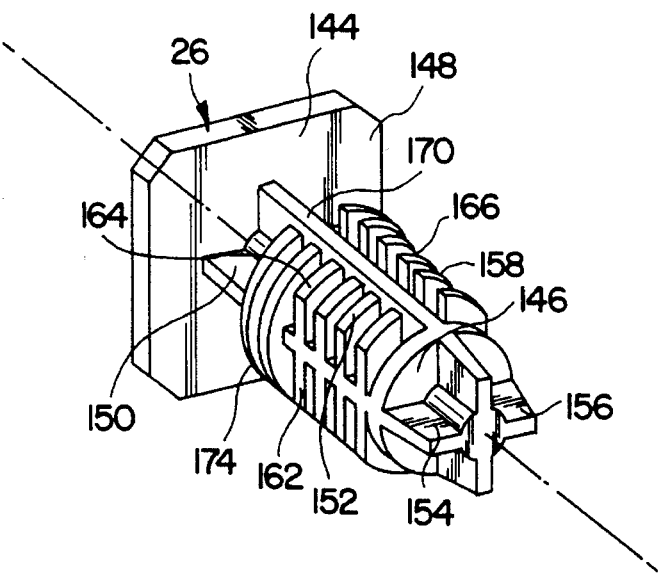
FIG. 10 is a perspective view of another form of fastener suitable for use in the present invention.

Referring now to FIG. 10, fastener 26 used in conjunction with sidewall protector 22 and column protector 28 includes a head portion 144 and a body portion 146 extending out of one side 148 of head portion. Body portion 146 includes a central shank 150 and a plurality of equidistant retaining fins 152 extending from one side 154 of central shank 150. Extending from opposite side 156 of central shank 150 is a second plurality of equidistant retaining fins 158.

As can be seen from FIG. 7, retaining fins 152 are staggered along the central longitudinal axis 160 of central shank 150 in relation to retaining fins 158. Retaining fins 152 are offset from retaining fins 158 by a distance equal to at least the width of one of the retaining fins 152. Referring back to FIG. 10, retaining fins 152 are comprised of a pair of identical extending flanges 162 and 164. Identical flanges 162 and 164 extend from opposite sides of shank segment 154. Retaining fins 158 are comprised of a pair of identical extending flanges, only one of which is shown at 166 which extend from side 156 of central shank member.

Central shank 150 further includes a first strengthening rib 170 and a second strengthening rib 172. First strengthening rib 170 is located between retaining fins 152 and retaining fins 158. Second strengthening rib 172 is disposed on an opposite side of central shank member 150 between retaining fins 152 and retaining fins 158.

Locking fin 174 is disposed between head portion 144 of fastener 26 and retaining fins 152 along central longitudinal axis 160 of fastener 26. A second locking fin 174 is disposed between head portion 144 and retaining fins 158 along central longitudinal axis 160. The fastener of the present invention is manufactured from a polymeric material. The preferred embodiment is manufactured from a nylon 6—6 material including an ultraviolet light resistor.

Having discussed the structural characteristics of the door edge protection system of the present invention, attention is now turned to application of the present invention in vehicle carriers. Wall section 21, shown in FIG. 1, includes roof rail 16, support column 30 and side wall segments 24 and 25. Roof rail protector 14 is disposed upon roof rail 16 at a vehicle door impact level to prevent accidental contact with door edge 176 of vehicle door. Shock absorbent member 44 of roof rail protector 14 is disposed upon mounting platform 38 such that it will contact vehicle door 10 upon opening before vehicle door 10 reaches roof rail 16. Shock absorbent member 44, along with frame 32, absorbs most of the shock generated by the vehicle door and prevents damage to the vehicle door edge 176.

As discussed previously, the roof rail protector of the prior art required utilization of numerous fastening clips 66 which were mated to roof rails of different heights. As can be seen from FIGS. 1, 4 and 9, fastening clip 18 attaches to roof rail portion 20 through the use of first hook portion 58. First hook portion 58 can be utilized regardless of the overall height of roof rail 16. As such, in use, roof rail protector 14 can be attached to any roof rail of any height having a top portion 20. Roof rail protector 14 may be made in any length to accommodate any roof rail length or can be made in standard lengths and positioned next to each other for easier packaging and installation.

Figure 8:
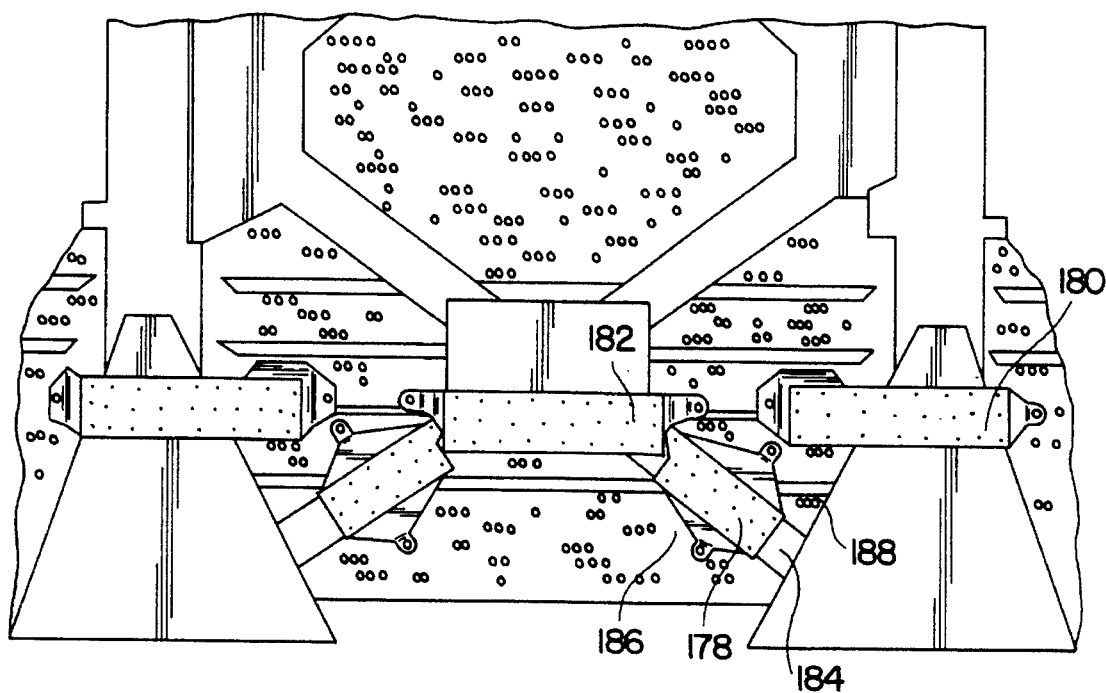
FIG. 8 is an elevational view of a plurality of alternative embodiments of the column protector of the present invention illustrated on a cross-brace of a rail car.

Referring now to FIGS. 1, 3 and 8, the support protector of the present invention is utilized to prevent accidental contact between vehicle door 10 and a support column 30 disposed on wall section 21. Vehicle carriers commonly include vertical supports, as shown in FIG. 3, and cross-brace supports as shown in FIG. 8. The support protector of the present invention extends from one side wall segment 24 over a support 30 and affixes to a second side wall segment 25.

As can be seen in FIG. 1, the support protector of the present invention is disposed at a vehicle door impact level corresponding to a probable contact point of the vehicle door 10 with support column 30. As discussed previously, the shock absorbent member 76 of the support protector is disposed between the support column and the vehicle door to absorb any damaging impact. The thickness of the shock absorbent material 76 may be varied with respect to the weight of the door of the vehicles being transported. For example, a vehicle carrier carrying large vehicles may require a thicker shock absorbent member.

With particular reference to FIG. 8, it can be seen that protection of a vehicle door from cross-brace impact damage requires a plurality of support protectors 178, 180 and 182 of various sizes and shapes. All support protectors of the present invention bridge the particular support to be protected from one side wall segment to another side wall segment. For example, support protector 178 bridges support 184 from side wall segment 186 to side wall segment 188.

Fastener 26, is utilized to affix the support protector to ventilation apertures located in the side wall segments. The specific cooperation of fastener 26 with the ventilation apertures is discussed below with respect to the side wall protector of the present invention.

Side wall protector 22, as illustrated in FIG. 1 operates to locate shock absorbent member 112 between the vehicle door 10 and the side wall segment 24. Shock absorbent member 112 receives the impact shock from vehicle door 10 prior to vehicle door 10 contacting side wall segment 24. Shock absorbent member 112 and frame 104 absorb the force from the moving door 10 preventing accidental damage to door edge 176.

Attachment portion 108 of side wall protector 22 includes a spring biased section 109. Spring biased section 109 moves from a first position extending out from side wall segment 24 to a second position abutting side wall segment 24 after insertion of fastener 26. The first position of spring biased segment 109 is shown in FIG. 6 and the second position of spring biased section 109 is shown in FIG. 7. Upon moving from the first position to the second position it can be seen that frame 104 of side wall protector 22 is thus properly located in relation to side wall segment 24. It follows that shock absorbent member 112 affixed to mounting platform 110 is simultaneously properly located with respect to vehicle door 10 and in particular to vehicle door edge 176 as the attachment portion is pinched together as shown in FIGS. 1 and 7.

With particular reference to FIGS. 6 and 7, it can be seen that a side wall segment of the vehicle wall section is perforated and corrugated. This corrugation or non-planar configuration makes it difficult for attachment of conventional fasteners to the ventilation apertures located within. As can be seen, the ventilation apertures disposed on the corrugated side wall segment are often disposed in an angled relation.

The fastener 26 of the present invention is specifically configured to cooperate with ventilation apertures 190 disposed in an angled relation within the side wall segment 24. Referring now to FIGS. 6, 7 and 10, fastener 26 includes the plurality of retaining fins 152 and an opposing plurality of retaining fins 158. Retaining fins 152 and 158 are located along central shank 150. Retaining fins 152 are staggered along the central longitudinal axis 160 of central shank 150 in relation to retaining fins 158. The staggered relation is necessary for maximum cooperation of fastener 26 with angled ventilation apertures 190. FIG. 7 illustrates the cooperation of retaining fins 152 and 158 within aperture 190. Aperture 190 is defined between surface 192 and 194 of side wall segment 24.

As can be seen from FIGS. 6 and 7, the plurality of retaining fins 152 and 158 work in cooperation with surfaces 192 and 194 to retain fastener 26 within aperture 190. The staggered relation of retaining fins 152 and 158 allow disposition of surfaces 192 and 194 between retaining fins 152 and 158 in a staggered fashion. The staggered relationship of the retaining fins along the central longitudinal axis 160 of the fastener allows for one portion of the ventilation aperture 196 to cooperate with retaining fins 152 and 158 on one side of central shank 150 of fastener 26, and a different pair of retaining fins on the opposite side of central shank 150 to cooperate with another portion 198 of ventilation aperture 190. Thus, fastener 126, with this staggered configuration allows for insertion of the fastener in an angled relation and affords better retention within aperture 190.

The best mode for carrying out the invention has been described in detail, those familiar with the art to which this invention relates will recognize various alternative designs and embodiments for practicing the invention as defined by the following claims.

What is claimed is:

1. A door edge protector for attachment to a vehicle transport wall section including a first surface and a second surface, said door edge protector comprising:
   a frame including a support portion having a first fastening aperture and an attachment portion having a second fastening aperture, and said support portion extending sufficiently from said attachment portion to form a mounting platform;
   a normally removable fastener for securing said attachment portion to said wall section, said fastener including a first hook portion which passes through said first and second fastening apertures and configured for cooperatively engaging at least one of said first and second surfaces for locating said frame with respect to said wall section; and
   a shock absorbent member affixed to said mounting platform and wherein said frame is constructed from an integral sheet of corrugated plastic material.

2. The door edge protector of claim 1 wherein said first and second surfaces of said wall section define a roof rail, said fastener being insertable through both said first fastening aperture and said second fastening aperture for locating said attachment portion with respect to said support portion.

3. The door edge protector of claim 2 wherein said fastener is adapted to engage both said first and second surfaces and is configured to hang on said roof rail.

4. The door edge protector of claim 3 wherein said frame includes first, second, and third fold lines, each fold line extending from a first end of said frame to a second end of said frame, said mounting platform disposed between said first and second fold lines, a truss portion disposed between said second and third fold lines, and said attachment portion disposed on the opposite side of said third fold line from said truss portion.

5. The door edge protector of claim 3 wherein said fastener includes a second hook portion, and a transition portion disposed between the first and second hook portions, said transition portion including a support shoulder for preventing said second hook portion from traveling within the first fastening aperture.

6. The door edge protector of claim 1 wherein said shock absorbent member is a polymeric foam.

7. A door edge protector for attachment to a vehicle transport wall section including a first surface and a second surface defining a roof rail therebetween, said door edge protector comprising:
   a frame including a support portion and an attachment portion, said support portion having a first fastening aperture and said attachment portion having a second fastening aperture, and said support portion extending sufficiently from said attachment portion to form a mounting platform;
   a normally removable fastener for securing said attachment portion to said wall section, said fastener including a first hook portion which passes through both said first fastening aperture and said second fastening aperture and configured for cooperatively engaging at least one of said first and second surfaces for locating said frame with respect to said wall section; and
   a shock absorbent member affixed to said mounting platform; wherein said normally removable fastener includes a second hook portion for engaging said first surface to hang on said roof rail in the securement of said attachment portion, a transition portion extending from said second hook portion, a planar shoulder portion extending from said transition portion for locating said fastener with respect to said first and second fastening apertures, and the first hook portion extending from said planar shoulder portion for engaging said second surface to support said shock absorbent member with respect to said transport wall section so that a door edge may be protected.

8. A door edge protector for attachment to a vehicle transport wall section including a first surface and a second surface, said door edge protector comprising:
   a frame including a support portion having a first fastening aperture and an attachment portion having a second fastening aperture, and said support portion extending sufficiently from said attachment portion to form a mounting platform;
   a normally removable fastener for securing said attachment portion to said wall section, said fastener including a first hook portion which passes through said first and second fastening apertures and configured for cooperatively engaging at least one of said first and second surfaces for locating said frame with respect to said wall section; and
   a shock absorbent member affixed to said mounting platform wherein said first and second surfaces of said wall section define a roof rail, said fastener being insertable through both said first fastening aperture and said second fastening aperture for locating said attachment portion with respect to said support portion, wherein said fastener is adapted to engage both said first and second surfaces and is configured to hang on said roof rail; and wherein said fastener includes a second hook portion, and a transition portion disposed between the first and second hook portions, said transition portion including a support shoulder for preventing said second hook portion from traveling within the first fastening aperture.

9. A door edge protector for attachment to a vehicle transport wall section including a first surface and a second surface, said door edge protector comprising:

a frame including a support portion having a first fastening aperture and an attachment portion having a second fastening aperture, and said support portion extending sufficiently from said attachment portion to form a mounting platform;

a normally removable fastener for securing said attachment portion to said wall section, said fastener including a first hook portion which passes through said first and second fastening apertures and configured for cooperatively engaging at least one of said first and second surfaces for locating said frame with respect to said wall section; and a shock absorbent member affixed to said mounting platform wherein said first and second surfaces of said wall section define a roof rail, said fastener being insertable through both said first fastening aperture and said second fastening aperture for locating said attachment portion with respect to said support portion, wherein said fastener is adapted to engage both said first and second surfaces and is configured to hang on said roof rail; and wherein said frame includes first, second, and third fold lines, each fold line extending from a first end of said frame to a second end of said frame, said mounting platform disposed between said first and second fold lines, a truss portion disposed between said second and third fold lines, and said attachment portion disposed on the opposite side of said third fold line from said truss portion.

* * * * *